US009084237B2

(12) United States Patent
Chen et al.

(10) Patent No.: US 9,084,237 B2
(45) Date of Patent: Jul. 14, 2015

(54) METHOD AND APPARATUS FOR PROCESSING A DATA TRANSMISSION CONFLICT OF A RELAY-NODE

(75) Inventors: Si Chen, Shenzhen (CN); Jian Zhang, Shenzhen (CN); Guanzhou Wang, Shenzhen (CN); Yincheng Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 222 days.

(21) Appl. No.: 13/502,770

(22) PCT Filed: Sep. 3, 2010

(86) PCT No.: PCT/CN2010/076621
§ 371 (c)(1),
(2), (4) Date: Apr. 19, 2012

(87) PCT Pub. No.: WO2011/047580
PCT Pub. Date: Apr. 28, 2011

(65) Prior Publication Data
US 2012/0207083 A1    Aug. 16, 2012

(30) Foreign Application Priority Data

Oct. 23, 2009   (CN) .......................... 2009 1 0207582

(51) Int. Cl.
*H04W 72/04* (2009.01)
*H04W 84/04* (2009.01)
*H04W 72/12* (2009.01)

(52) U.S. Cl.
CPC .......... *H04W 72/04* (2013.01); *H04W 72/1263* (2013.01); *H04W 84/047* (2013.01)

(58) Field of Classification Search
CPC ..... H04W 72/04; H04W 72/12; H04W 74/02; H04W 88/04
USPC .............. 370/315, 276, 277, 310, 329; 455/7, 455/450, 561; 375/211
See application file for complete search history.

(56) References Cited

U.S. PATENT DOCUMENTS

| 2010/0120442 A1* | 5/2010 | Zhuang et al. ................ 455/450 |
| 2010/0316096 A1* | 12/2010 | Adjakple et al. ............. 375/211 |
| 2011/0222428 A1* | 9/2011 | Charbit et al. ................ 370/252 |

* cited by examiner

*Primary Examiner* — Edan Orgad
*Assistant Examiner* — Saumit Shah
(74) *Attorney, Agent, or Firm* — Panitch Schwarze Belisario & Nadel LLP

(57) ABSTRACT

The present invention discloses a method and an apparatus for processing a data transmission conflict of a relay-node (RN), wherein the method for processing comprises: under the circumstance that the above RN is configured with multi-subframe scheduling resources on a backhaul subframe, if the above RN has acquired dynamic resources on the above backhaul subframe, receiving or sending, by the above RN, data by using the above multi-subframe scheduling resources or the above dynamic resources on the above backhaul subframe, or performing no processing; if the above RN has acquired semi-persistent resources on the above backhaul subframe, receiving or sending, by the above RN, data by using the above multi-subframe scheduling resources or the above semi-persistent resources on the above backhaul subframe, or performing no processing. According to the present invention, the problem of the data transmission conflict is solved, thereby achieving the normal transmission.

22 Claims, 6 Drawing Sheets if the RN having acquired dynamic resources on the backhaul subframe, the RN receiving or sending data by using the multi-subframe scheduling resources or the dynamic resources on the backhaul subframe, or performing no processing — S202 if the RN having acquired semi-persistent resources on the backhaul subframe, the RN receiving or sending data by using the multi-subframe scheduling resources or the semi-persistent resources on the backhaul subframe, or performing no processing — S204

METHOD AND APPARATUS FOR PROCESSING A DATA TRANSMISSION CONFLICT OF A RELAY-NODE

CROSS-REFERENCE TO RELATED APPLICATION

This application is a Section 371 of International Application No. PCT/CN2010/076621, filed Sep. 3, 2010, which was published in the Chinese language on Apr. 28, 2011, under International Publication No. WO 2011/047580 A1, and the disclosure of which is incorporated herein by reference.

FIELD OF THE INVENTION

The present invention relates to the communication field, and in particular to a method and an apparatus for processing a data transmission conflict of a relay-node (Relay-Node abbreviated as RN).

BACKGROUND OF THE INVENTION

A scheduling/priority handling functional entity exists in the radio interface media access control (Media Access Control abbreviated as MAC) protocol layer of the evolved universal terrestrial radio access network (Evolved Universal Terrestrial Radio Access Network which is abbreviated as E-UTRAN and constituted by the base station eNB, therefore is also referred to as the base station eNB) in the third generation mobile communication long term evolution (Long Term Evolution abbreviated as LTE) system, wherein the scheduling function supports a dynamic scheduling and a semi-persistent scheduling (Semi-persistent Scheduling abbreviated as SPS) (or is referred to as a semi-static scheduling).

The dynamic scheduling refers that the E-UTRAN can dynamically allocate resources to user equipment (User Equipment abbreviated as UE) in each transmit time interval (Transmit Time Interval, TTI, corresponds to a subframe) by a temporary cell radio network identifier (Temporary cell radio network identifier abbreviated as C-RNTI) on a physical downlink control channel (Physical Downlink Control Channel abbreviated as PDCCH) for receiving/sending the data by the UE. The resources comprise a physical resource block (Physical Resource Block abbreviated as PRB) and a modulation and coding scheme (Modulation and Coding Scheme abbreviated as MCS) and so on.

The semi-persistent scheduling refers that the E-UTRAN can allocate semi-persistent resources to the UE by a semi-persistent scheduling temporary cell radio network identifier (Semi-Persistent Scheduling C-RNTI abbreviated as SPS C-RNTI) on the PDCCH for receiving or sending the data by the UE. The resources comprise a physical resource block (PRB) and a modulation and coding scheme (MCS) and so on. In the semi-persistent scheduling, a hybrid automatic repeat request (Hybrid ARQ abbreviated as HARQ) of the UE is transmitted by using the semi-persistent resources for the first time, and the HARQ is retransmitted by using the resources of the dynamic scheduling. The semi-persistent resources generate repeatedly according to the configured period, and the UE is configured with subframes of the semi-persistent resources. If the UE has not monitored the C-RNTI of the PDCCH thereon, it carries out the receiving or sending according to the semi-persistent resources in the corresponding subframe. The UE is configured with subframes of the semi-persistent resources, and if the UE has monitored the C-RNTI of the PDCCH thereon, it uses the dynamic resources which are instructed by the PDCCH to override the semi-persistent resources in the corresponding subframe.

In order to meet the increasing demand of the mobile access with large bandwidth and high-speed, the third generation partnership projects (Third Generation Partnership Projects abbreviated as 3GPP) introduce a long-term evolution advance (Long-Term Evolution advance abbreviated as LTE-Advanced) standard. LTE-Advanced uses a series of technologies to expand the frequency domain and the spatial domain on the basis of the retained core for the LTE evolution, so as to achieve the purposes of improving the frequency spectrum availability, increasing the system capacity and so on. The radio relay technology is one of the technologies in the LTE-Advanced and is intended to expand the coverage of the cell, reduce the dead area in the communication, balance the load, and transfer the services of the hot area and save the transmitting power of the terminal (or referred to as the user equipment UE). As shown in FIG. 1, some new relay-nodes are added between the Donor-eNB and the UE, and these newly added RNs are connected with the Donor-eNB by the wireless and have no wired connection with the transmission network. In this case, the radio link between the Donor-eNB and the RN is referred to as a backhaul link, and the radio link between the RN and the UE is referred to as an access link. The downlink data first reaches the Donor-eNB, then is transferred to the RN, and then is transmitted by the RN to the UE, and the uplink is opposite.

In order to configure the resources of the backhaul link, a physical downlink control channel (R-PDCCH), a physical downlink shared channel (R-PDSCH) and a physical uplink shared channel (R-PUSCH) dedicated to the RN are defined. The R-PDCCH is used for dynamically or semi-statically allocating the R-PDSCH resources and the R-PUSCH resources, wherein the R-PDSCH resources are used for transmitting the downlink data of the backhaul link and the R-PUSCH resources are used for transmitting the uplink data of the backhaul link.

In addition to be capable of still using the functions of the above dynamic scheduling and semi-persistent scheduling to schedule the RN, the Donor-eNB has a new scheduling function to schedule the RN, which refers that the R-PDCCH can instruct the downlink resources/the uplink resources of a plurality of backhaul subframes. This method for instructing the resources is referred to as a multi-subframe scheduling hereinafter.

Taking the downlink transmission as an example, the RN has received downlink assignment of the dynamic scheduling (or the semi-persistent scheduling) during the process of receiving the downlink data according to downlink assignment of the downlink multi-subframe scheduling. If a subframe which is instructed by the downlink assignment of the received dynamic scheduling (or semi-persistent scheduling) to receive the downlink data is identical to a subframe which is instructed by the downlink assignment of the multi-subframe scheduling to receive the downlink data, namely a conflict occurs in the subframe, at this time it needs to introduce a mechanism such that the RN can solve the conflict problem and the follow-up normal transmission can be achieved.

Similarly, in the uplink transmission, the RN has received uplink authorization of the dynamic scheduling (or the semi-persistent scheduling) during the process of sending the uplink data according to uplink authorization of the uplink multi-subframe scheduling. If a subframe which is instructed by the uplink authorization of the received dynamic scheduling (or semi-persistent scheduling) to send the uplink data is identical to a subframe which is instructed by the uplink authorization of the multi-subframe scheduling to send the uplink data, namely a conflict occurs in the subframe, at this time it needs to introduce a mechanism such that the RN can solve the conflict problem and the follow-up normal transmission is achieved.

Aiming at the problem existing in the relevant art that a conflict occurs easily in the data transmission, currently an effective solution has not been proposed yet.

SUMMARY OF THE INVENTION

The present invention is proposed aiming at the problem existing in relevant art that a conflict occurs easily in the data transmission. For this purpose, the present invention provides a method and an apparatus for processing a data transmission conflict of an RN, so as to solve at least one of the above problems.

A method for processing a data transmission conflict of an RN is provided according to an aspect of the present invention.

A method for processing a data transmission conflict of an RN according to the present invention comprises: under the circumstance that the above RN is configured with multi-subframe scheduling resources on a backhaul subframe, if the above RN has acquired dynamic resources on the above backhaul subframe, the above RN receiving or sending data using the above multi-subframe scheduling resources or the above dynamic resources on the above backhaul subframe, or performing no processing; if the above RN has acquired semi-persistent resources on the above backhaul subframe, the above RN receiving or sending data using the above multi-subframe scheduling resources or the above semi-persistent resources on the above backhaul subframe, or performing no processing.

An apparatus for processing a data transmission conflict of a relay-node (RN) is provided according to another aspect of the present invention.

Under the circumstance that the above RN is configured with multi-subframe scheduling resources on a backhaul subframe, the above apparatus for processing comprises: an acquisition module, adapted to acquire dynamic resources and semi-persistent resources on the above backhaul subframe; a first processing module, adapted to, under the circumstance that the above dynamic resources has been acquired on the above backhaul subframe, receive or send data by using the above multi-subframe scheduling resources or the above dynamic resources on the above backhaul subframe, or performing no processing; and a second processing module, adapted to, under the circumstance that the above semi-persistent resources has been acquired on the above backhaul subframe, receive or send data by using the above multi-subframe scheduling resources or the above semi-persistent resources on the above backhaul subframe, or performing no processing.

According to the present invention, under the circumstance that a data transmission conflict occurs between the multi-subframe scheduling and the dynamic scheduling or a data transmission conflict occurs between the multi-subframe scheduling and the semi-persistent scheduling, the RN carries out the data transmission according to the multi-subframe scheduling, the dynamic scheduling or the semi-persistent scheduling by using the corresponding resources, thereby solving the problem of the data transmission conflict and achieving the normal transmission.

BRIEF DESCRIPTION OF THE DRAWINGS

The drawings illustrated herein provide a further understanding of the present invention and form a part of the present application. The exemplary embodiments and the description thereof are used to explain the present invention and do not constitute undue limitation on the scope of the present invention. In the drawings.

DETAILED DESCRIPTION OF EMBODIMENTS

The present invention is described hereinafter in detail with reference to the drawings and in combination with the embodiments. It needs to be noted that the embodiments and the features of the embodiments in the present application can be combined with each other under the circumstances that there is no conflict.

Aiming at the problem existing in the relevant art that a conflict occurs easily in the data transmission, the invention provides a method and an apparatus for processing a data transmission conflict. According to the solution of the present invention, under the circumstance of a data transmission conflict, an RN can choose to carry out the data transmission according to a multi-subframe scheduling or a dynamic scheduling (or a semi-persistent scheduling), thereby solving the problem of the data transmission conflict and achieving the normal transmission.

A method for processing a data transmission conflict of an RN is provided according to an embodiment of the present invention.

Figure 1:
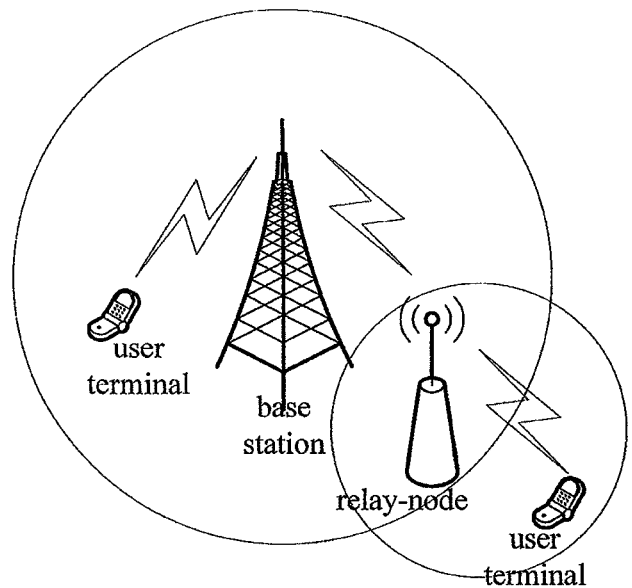
FIG. 1 is a schematic diagram of using the network architecture of the relay technology according to the relevant art.
Figure 2:
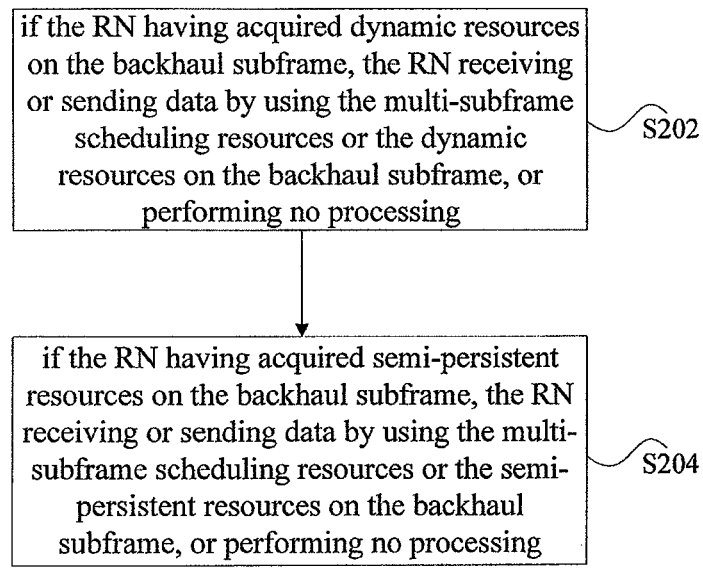
FIG. 2 is a flow chart of a method for processing a data transmission conflict according to an embodiment of the present invention.

The embodiment according to the present invention is applied to the following scenario: the RN is configured with multi-subframe scheduling resources on a backhaul subframe, and a data transmission conflict in the RN occurs on the above backhaul subframe. As shown in FIG. 2, the method comprises the following step S202 to step S204.

S202, if the above RN has acquired dynamic resources on the above backhaul subframe, then the above RN receives or sends data by using the above multi-subframe scheduling resources or the above dynamic resources on the above backhaul subframe, or performs no processing.

S204, if the above RN has acquired semi-persistent resources on the above backhaul subframe, then the above RN receives or sends data by using the above multi-subframe scheduling resources or the above semi-persistent resources on the above backhaul subframe, or performs no processing.

The dynamic resources can be acquired by the following steps:

1) on the above backhaul subframe or before the above backhaul subframe, the above RN detects and obtains the above dynamic resources by a temporary cell radio network identifier (C-RNTI) or a Dedicated C-RNTI of the above RN on a physical downlink control channel (R-PDCCH) which is dedicated to above RNs; or 2) under the circumstance that the above dynamic resources are used for sending uplink data, on the above backhaul subframe, the above RN is configured with the dynamic resources used in non-adaptive retransmission for instructing the above RN to send the uplink data on the above backhaul subframe.

The semi-persistent resources can be acquired by the following resources:

1) on the above backhaul subframe or before the above backhaul subframe, the above RN detects and obtains the above semi-persistent resources by a semi-persistent scheduling temporary cell radio network identifier (SPS C-RNTI) or an SPS Dedicated C-RNTI of the above RN on a physical downlink control channel (R-PDCCH) which is dedicated to above RNs; or 2) on the above backhaul subframe, the above RN is configured with the semi-persistent resources.

Under the circumstance that the above RN has acquired the dynamic resources on the above backhaul subframe, after the above RN has received or sent data by using the above multi-subframe scheduling resources on the above backhaul subframe, the above RN deletes the configuration for the above multi-subframe scheduling resources; or, before or after the above RN has received or sent data by using the above multi-subframe scheduling resources on the above backhaul subframe, the above RN reserves the configuration for the above multi-subframe scheduling resources; or, before or after the above RN has received or sent data by using the above dynamic resources on the above backhaul subframe, the above RN deletes or reserves the configuration for the above multi-subframe scheduling resources.

Under the circumstance that the above RN has acquired the semi-persistent resources on the above backhaul subframe, after the above RN has received or sent data by using the above multi-subframe scheduling resources on the above backhaul subframe, the above RN deletes the configuration for the above multi-subframe scheduling resources; or, before or after the above RN has received or sent data by using the above multi-subframe scheduling resources on the above backhaul subframe, the above RN reserves the configuration for the above multi-subframe scheduling resources; or, before or after the above RN has received or sent data by using the above semi-persistent resources on the above backhaul subframe, the RN deletes or reserves the configuration for the above multi-subframe scheduling resources.

Further, under the circumstance that the above RN has acquired the semi-persistent resources on the above backhaul subframe, before or after the above RN has received or sent data by using the above multi-subframe scheduling resources on the above backhaul subframe, the RN can delete or reserve the configuration for the above semi-persistent resources; or, after the above RN has received or sent data by using the above semi-persistent resources on the above backhaul subframe, the RN deletes the configuration for the above semi-persistent resources; or, before or after the above RN has received or sent data by using the above semi-persistent resources on the above backhaul subframe, the RN reserves the configuration for the above semi-persistent resources.

Under the circumstance that the above RN receives or sends the data by using the dynamic resources or the semi-persistent resources on the current backhaul subframe and the above RN reserves the configuration for the multi-subframe scheduling resources, on the next backhaul subframe which is located after the current backhaul subframe and instructed by a multi-subframe scheduling, the RN uses an HARQ process corresponding to the next backhaul subframe, or the RN uses an HARQ process corresponding to the current backhaul subframe to carry out the operation of receiving or sending the data.

The above RN uses the dynamic resources or the semi-persistent resources to receive or send the data can comprise: the RN using the above dynamic resources or the above semi-persistent resources with the hybrid automatic repeat request (HARQ) process to receive or send the data, wherein the above HARQ process comprises: one of HARQ processes which is instructed by the multi-subframe scheduling, or an HARQ process which is not instructed by the multi-subframe.

Preferably, the above multi-subframe scheduling resources refer to resources which are allocated by a base station to the RN, adapted to instruct the above RN to receive the data on the sequential a plurality of downlink backhaul subframes or send the data on the sequential a plurality of uplink backhaul subframes.

The process of implementing the embodiment of the present invention will be described in detail hereinafter in conjunction with the examples.

First, the process that the RN carries out the service transmission will be described briefly. The process that the RN carries out the service transmission according to the embodiment of the present invention mainly comprises the following steps.

Step S302: the RN acquires configuration information of the downlink backhaul subframes and the uplink backhaul subframes, so that the RN knows which ones are the downlink backhaul subframes and which ones are the uplink backhaul subframes.

In this step, the RN can acquire the configuration information of the downlink backhaul subframes by a dedicated RRC signaling or system information which is provided by the base station. The RN can acquire the configuration information of the uplink backhaul subframes by a dedicated RRC signaling or system information which is provided by the base station or according to rules predefined by the system and the configuration information of the downlink backhaul subframes. The rules predefined by the system can be existing HARQ time sequence, for example, in the FDD a subframe that is 4 ms behind a downlink backhaul subframe is an uplink backhaul subframe. The rules predefined by the system can also be HARQ time sequence which is dedicated to the RN. The HARQ time sequence which is dedicated to the RN can be predefined by the system and can also be acquired by the RN through the RRC signaling provided by the base station.

Furthermore, the configuration information of the downlink backhaul subframes and the uplink backhaul subframes can also comprise a corresponding relationship between a subframe and the HARQ process, which refers that each subframe occupies which process to carry out the downlink or the uplink transmission. Certainly, the corresponding relationship between the subframe and the process can also be predefined by the system.

Step S304: the RN acquires scheduling information of the multi-subframe scheduling and starts the multi-subframe scheduling according to the scheduling information.

The method that the RN acquires the scheduling information can comprise: the RN acquiring downlink assignment (or uplink authorization) instructed by a DCI (Downlink Control Information) format which is dedicated to the multi-subframe scheduling on the R-PDCCH according to the C-RNTI; or, the RN acquiring downlink assignment (or uplink authorization) instructed by the existing DCI format on the R-PDCCH according to the RNTI which is dedicated to the multi-subframe scheduling; or, the RN acquiring downlink assignment (or uplink authorization) instructed by a DCI (Downlink Control Information) format which is dedicated to the multi-subframe scheduling on the R-PDCCH according to the RNTI which is dedicated to the multi-subframe scheduling; or, the RN acquiring downlink assignment (or uplink authorization) instructed by an MAC control element (Control Element abbreviated as CE) which is dedicated to the multi-subframe scheduling; or, the RN acquires downlink assignment (or uplink authorization) which is previously reserved for the multi-subframe scheduling.

In this case, the RNTI which is dedicated to the multi-subframe scheduling is configured by the RRC signaling.

The DCI which is dedicated to the multi-subframe scheduling at least comprises a physical resource block (Physical Resource Block abbreviated as PRB) and a modulation and coding scheme (Modulation and Coding Scheme abbreviated as MCS) of an initial subframe. If the number of the subframes is not prior predefined by the system or acquired by the RRC signaling, the number of the subframes must be comprised; if the PRBs (MCSs) of subsequent subframes are different from that of the initial subframe, the PRBs (MCSs) of subsequent subframes must be comprised; if the process id of the initial subframe cannot be acquired according to the initial subframe (for example there is no corresponding relationship between a subframe and a process id), the process id of the initial subframe must be comprised. If the uplink and the downlink use the same DCI format, a flag bit must be comprised to distinguish that the DCI is used in the uplink or the downlink. Certainly, the dedicated DCI can comprise the NDI, the RV and the process ids of the subsequent subframes.

If the above DCI does not comprise the NDI, it indicates that the NDI uses the default value (which can be 1, also can be 0, and is pre-appointed) of the multi-subframe scheduling, meaning that the transmission is the first transmission. If the DCI does not comprise the RV, it indicates that the RV is 0, meaning that the HARQ redundant version 0 is transmitted.

The MAC CE which is dedicated to the multi-subframe scheduling at least comprises the PRB and the MCS of the initial subframe. If the number of the subframes is not prior predefined by the system or acquired by the RRC signaling, the number of the subframes must be comprised; if the PRBs (MCSs) of subsequent subframes are different from that of the initial subframe, the PRBs (MCSs) of subsequent subframes must be comprised; if the process id of the initial subframe cannot be acquired according to the initial subframe (for example there is no corresponding relationship between a subframe and a process id), the process id of the initial subframe must be comprised. If the uplink and the downlink use the same DCI format, a flag bit must be comprised to distinguish that the DCI is used in the uplink or the downlink. Certainly, the dedicated DCI can comprise the NDI, the RV and the process ids of the subsequent subframes.

If the above MAC CE does not comprise the NDI, it indicates that the NDI uses the default value (which can be 1, also can be 0, and is pre-appointed) of the multi-subframe scheduling, meaning that the transmission is the first transmission. If the MAC CE does not comprise the RV, it indicates that the RV is 0, meaning that the HARQ redundant version 0 is transmitted.

For the scenario of the downlink transmission, the RN has received downlink assignment of the multi-subframe scheduling sent by the base station on the subframe D1, and the downlink assignment instructs the RN to receive downlink data on the subframes D1, D2 and D3 and process respectively with the process 1, the process 2 and the process 3. The RN reserves the downlink assignment of the multi-subframe scheduling. For example, on the subframe D1, the RN receives the data according to the downlink assignment of the multi-subframe scheduling and processes the first transmission with the process 1.

For the scenario of the uplink transmission, the RN has received uplink authorization of the multi-subframe scheduling sent by the base station on the subframe D, and the uplink authorization instructs the RN to receive downlink data on the subframes U1, U2 and U3 and process respectively with the process 1, the process 2 and the process 3. The RN reserves the uplink authorization of the multi-subframe scheduling. For example, on the subframe U1, the RN sends the data according to the uplink authorization of the multi-subframe scheduling and processes the first transmission with the process 1.

Step S306: the RN acquires scheduling information of the dynamic scheduling (or the semi-persistent scheduling); a conflict occurs between the downlink (or the uplink) transmission instructed by the scheduling information and the downlink (or the uplink) transmission instructed by the scheduling information of the multi-subframe scheduling in the step S304; and then the RN processes the conflict according to the method for processing the data transmission conflict of the embodiment of the present invention, which is described subsequently.

The method that the RN acquires dynamic resources of the dynamic scheduling can comprise: the RN acquiring the downlink assignment (or the uplink authorization) on the R-PDCCH according to the C-RNTI, wherein the downlink assignment or the uplink authorization indicates the corresponding dynamic resources; or, the RN being configured with uplink resources used in non-adaptive retransmission.

The method that the RN acquires semi-persistent resources of the semi-persistent scheduling can comprise: the RN acquiring the downlink assignment (or the uplink authorization) on the R-PDCCH according to the SPS C-RNTI, wherein the downlink assignment or the uplink authorization indicates the corresponding dynamic resources; or, the RN being configured with the downlink SPS resources (or the uplink SPS resources); or, the RN being configured with uplink resources used in non-adaptive retransmission.

During the process of the downlink transmission, the above data transmission conflict refers that: on a current backhaul subframe, the RN is pre-configured to use multi-subframe scheduling resources instructed by a downlink multi-subframe scheduling to receive downlink data; moreover, on the backhaul subframe or before the backhaul subframe, the RN also acquires scheduling information of a dynamic scheduling or a semi-persistent scheduling, wherein the scheduling information of the dynamic scheduling or the semi-persistent scheduling instructs the RN to receive the downlink data by using the dynamic resources or the semi-persistent resources on the above backhaul subframe; in this way, the RN does not know whether to receive the downlink data by using the resources of the multi-subframe scheduling or by using the resources instructed by the dynamic scheduling or the semi-persistent scheduling; and thus the problem of the data transmission conflict occurs on the current backhaul subframe.

During the process of the uplink transmission, the above data transmission conflict refers that: on a current backhaul subframe, the RN is pre-configured to use multi-subframe scheduling resources instructed by an uplink multi-subframe scheduling to send uplink data; moreover, on the backhaul subframe or before the backhaul subframe, the RN also acquires scheduling information of a dynamic scheduling or a semi-persistent scheduling, wherein the scheduling information of the dynamic scheduling or the semi-persistent scheduling instructs the RN to send the uplink data by using the dynamic resources or the semi-persistent resources on the above backhaul subframe; in this way, the RN does not know whether to send the uplink data by using the resources of the multi-subframe scheduling or by using the resources instructed by the dynamic scheduling or the semi-persistent scheduling; and thus the problem of the data transmission conflict occurs on the current backhaul subframe.

The HARQ process, which is used by the scheduling information of the above dynamic scheduling (or the semi-persistent scheduling) to instruct the RN to receive the downlink data or send the uplink data, can be the HARQ process instructed by the scheduling information of the multi-subframe scheduling. For example, in the scenario of the downlink transmission, the base station instructs the RN to receive the downlink data on the subframes D1, D2 and D3 by the multi-subframe scheduling and to process respectively with the process 1, the process 2 and the process 3. If before the subframe D2, the base station has received feedback of the RN, which indicates that the RN fails to receive the downlink data on the D1, then the base station may schedule retransmission of this failed transmission on the subframe D2, and the dynamic scheduling can instruct the RN to receive the downlink data by using the process 1 (one of the processes instructed by the scheduling information of the multi-subframe scheduling). If the base station has configured the semi-persistent resources on the subframe D2 for the RN to receive the downlink data, then the process used in the semi-persistent scheduling has a certain corresponding relationship with the subframe, assuming that the process used correspondingly by the subframe D2 is the process 1 (one of the processes instructed by the scheduling information of the multi-subframe scheduling).

As another preferred embodiment of the present invention, the above HARQ process also can be a HARQ process not instructed in the scheduling information of the multi-subframe scheduling. For example, in the scenario of the downlink transmission, the base station instructs the RN to receive the downlink data on the subframes D1, D2 and D3 by the multi-subframe scheduling and to process respectively with the process 1, the process 2 and the process 3. If the base station temporarily has a service which needs to be sent to the RN on the subframe D2, the dynamic scheduling instructs the RN to receive the downlink data by using a process 4 (the process does not exist in the multi-subframe scheduling). If the base station has configured the semi-persistent resources on the subframe D2 to instruct the RN to receive the downlink data, then the process used in the semi-persistent scheduling has a certain corresponding relationship with the subframe, assuming that the process used correspondingly by the subframe D2 is the process 4 (the process does not exist in the multi-subframe scheduling).

In the scenario of the uplink transmission, the scheduling information of the dynamic scheduling (or the semi-persistent scheduling) can be similar to that of the downlink transmission.

A method for processing a data transmission conflict according to embodiments of the present invention will be described in conjunction with the drawings hereinafter. During the process of the uplink transmission or the downlink transmission, it assumes that a data transmission conflict occurs in a current subframe.

Embodiment 1

When a data transmission conflict occurs between the multi-subframe scheduling and the semi-persistent scheduling, the downlink assignment (or the uplink authorization) of the semi-persistent scheduling will be neglected on a backhaul subframe in which the conflict occurs while receiving the downlink data according to the downlink assignment of the multi-subframe scheduling (or sending the uplink data according to the uplink authorization of the multi-subframe scheduling). Considering that the semi-persistent scheduling has a certain periodicity (such as a typical period 20 ms), and the multi-subframe scheduling is to schedule consecutive a plurality of subframes, the possibility that the conflict continues to occur between them is very small, and therefore the semi-persistent resources and multi-subframe scheduling resources are reserved for the follow-up data transmission.

Then, the follow-up multi-subframe scheduling continues after the backhaul subframe, namely the downlink data is received according to the downlink assignment of the multi-subframe scheduling (or the uplink data is sent according to the uplink authorization of the multi-subframe scheduling) on a subframe which is located after the current backhaul subframe and used in the multi-subframe scheduling.

Figure 3:
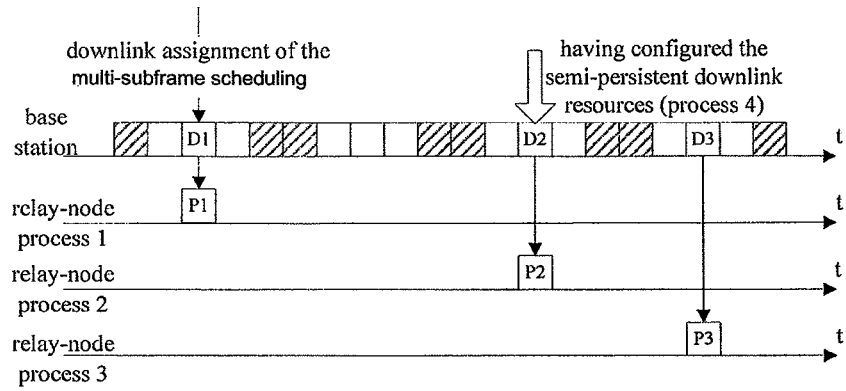
FIG. 3 is a particular flow chart of a method for processing a data transmission conflict of a relay-node according to embodiment 1 of the present invention.

In particular, in terms of the downlink transmission, it is shown in FIG. 3.

The RN receives and reserves downlink assignment of the multi-subframe scheduling sent by the base station on the subframe D1, and the downlink assignment instructs the RN to receive data on the subframes D1, D2 and D3 and process respectively with the process 1, the process 2 and the process 3. For example, the RN receives the data on the subframe D1 according to the downlink assignment of the multi-subframe scheduling and processes it with process 1.

Before the subframe D2 or on the subframe D2, the base station has configured and activated the semi-persistent scheduling for the RN and set that the period thereof is 20 ms. The RN has been configured with the semi-persistent downlink resources on the subframe D2, instructing the RN to receive the data on the D2 and process it with process 4. But the RN should receive the data on the D2 and process it with process 2 according to the reserved downlink assignment of the multi-subframe scheduling. That is to say, a data transmission conflict between the multi-subframe scheduling and the semi-persistent scheduling occurs on the subframe D2. At this time the RN processes according to the multi-subframe scheduling, namely it receives the data and processes it with process 2 and neglects the data reception instructed by the semi-persistent scheduling. The RN reserves the configuration for the semi-persistent resources and the multi-subframe resources.

The RN receives the downlink data on the D3 according to the reserved downlink assignment of the multi-subframe scheduling and processes it with process 3. At this time the multi-subframe scheduling ends, and the data transmission instructed by the reserved the configuration for semi-persistent resources does not conflict with this multi-subframe scheduling any more.

Figure 4:
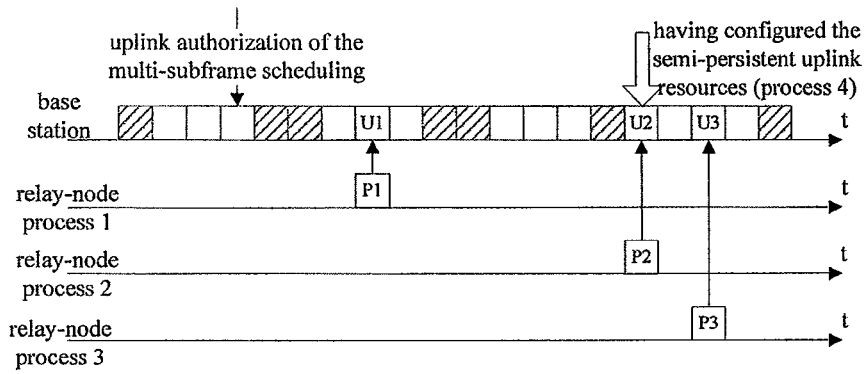
FIG. 4 is a particular flow chart of a method for processing a data transmission conflict of a relay-node according to embodiment 1 of the present invention.

In particular, in terms of the uplink transmission, it is shown in FIG. 4.

The RN has received uplink authorization of the multi-subframe scheduling sent by the base station on the subframe D. The uplink authorization instructs that: the RN receives downlink data on the subframes U1, U2 and U3 and processes it with process 1, process 2 and process 3 respectively; and the RN reserves the uplink authorization of the multi-subframe scheduling.

Before the subframe U2, the base station has configured and activated the semi-persistent scheduling for the RN and set that the period thereof is 20 ms. The RN has been configured with the semi-persistent downlink resources on the subframe U2, which instructs the RN to send the data on U2 and process it with process 4. But the RN should send the date on U2 and process it with process 2 according to the reserved uplink authorization of the multi-subframe scheduling. That is to say, a data transmission conflict between the multi-subframe scheduling and the semi-persistent scheduling occurs on subframe U2. At this time the RN processes according to the multi-subframe scheduling, namely it sends the data and processes it with process 2 and neglects the data sending instructed by the semi-persistent scheduling. The RN reserves the configuration for the semi-persistent resources and the multi-subframe resources.

The RN sends the uplink data on U3 according to the reserved uplink authorization of the multi-subframe scheduling and processes it with process 3. At this time the multi-subframe scheduling ends, and the data transmission instructed by the reserved the configuration for semi-persistent resources does not conflict with this multi-subframe scheduling any more.

As another preferred embodiment of the present invention, the RN also can delete the configuration for the semi-persistent resources, for example the occurrence of a conflict indicates that the semi-persistent scheduling is unsuccessful.

Figure 5:
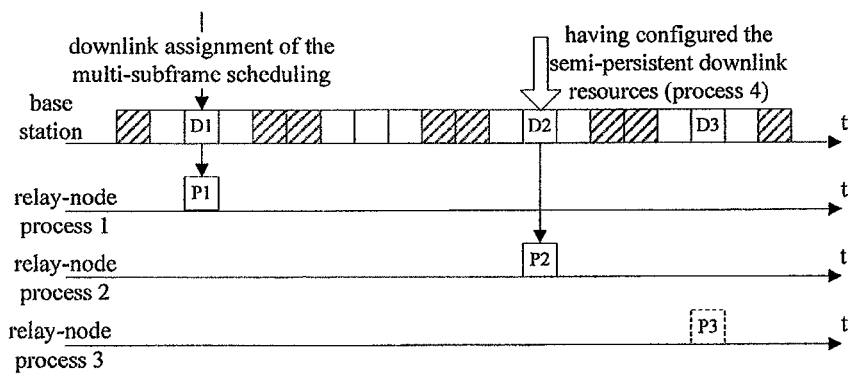
FIG. 5 is a particular flow chart of a method for processing a data transmission conflict of a relay-node according to embodiment 1 of the present invention.
Figure 6:
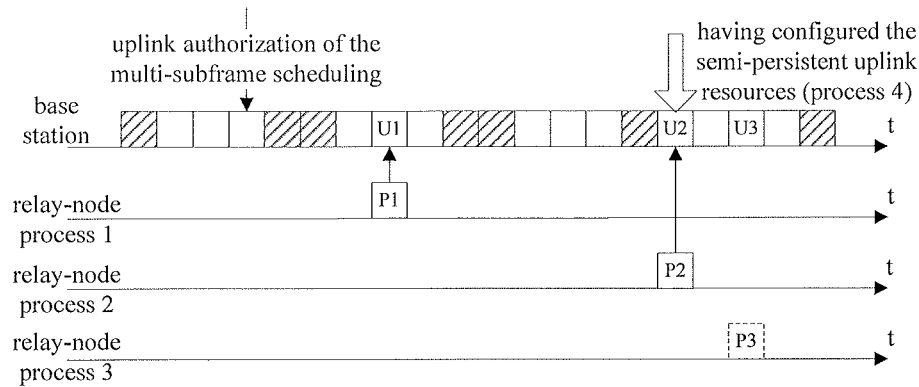
FIG. 6 is a particular flow chart of a method for processing a data transmission conflict of a relay-node according to embodiment 1 of the present invention.

As another preferred embodiment of the present invention, the RN also can delete the configuration for the multi-subframe scheduling resources, for example the base station allocating the semi-persistent resources for the RN implies that the multi-subframe scheduling is required to be terminated. As shown in FIG. 5 and FIG. 6, after the RN receives or sends the data on the conflicting subframe D2 or U2 according to the multi-subframe scheduling resources, it deletes the configuration for the multi-subframe scheduling resources, and on a backhaul subframe which is located after the conflicting backhaul subframe, such as D3 or U3, it does not continue processing according to this multi-subframe scheduling.

As another preferred embodiment of the present invention, the RN also can receive or send the data on the conflict subframe according to the semi-persistent resources, for example the base station allocating the semi-persistent resources is to hope that the RN receives or sends the data according to the semi-persistent resources immediately. As another preferred embodiment of the present invention, the RN also can perform no processing on the conflicting subframe.

Figure 7:
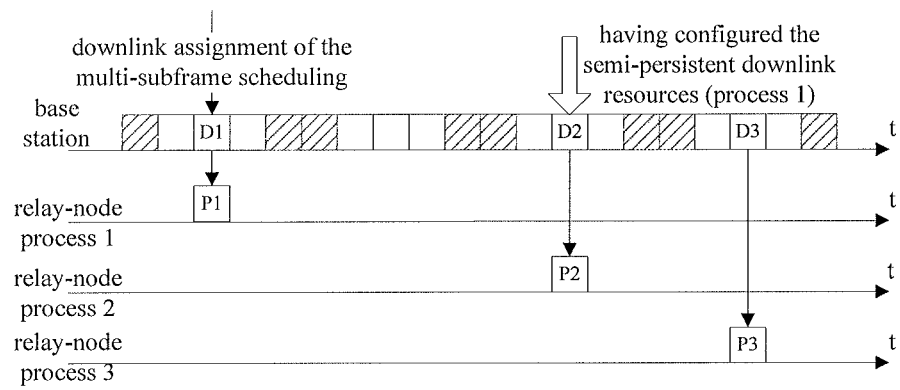
FIG. 7 is a particular flow chart of a method for processing a data transmission conflict of a relay-node according to embodiment 1 of the present invention.
Figure 8:
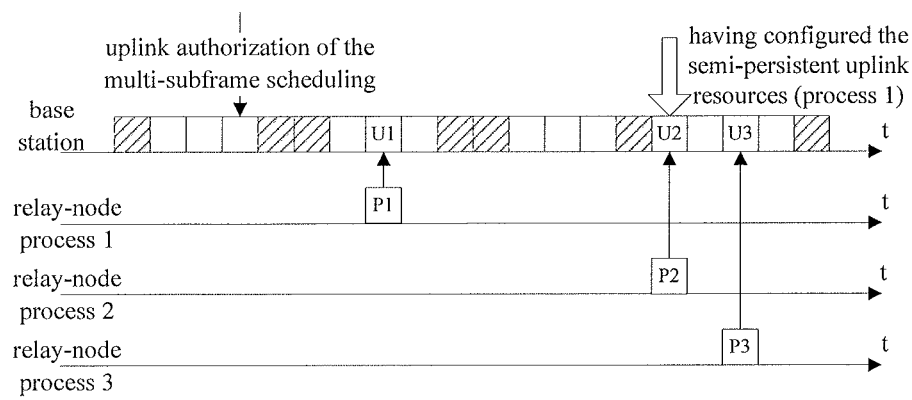
FIG. 8 is a particular flow chart of a method for processing a data transmission conflict of a relay-node according to embodiment 1 of the present invention.

As another preferred embodiment of the present invention, the process of the semi-persistent scheduling instructing to receive the downlink data or send the uplink data can comprise: a process instructed by the multi-subframe scheduling (such as process 1, as shown in FIG. 7 and FIG. 8; process 2 and process 3), or the other processes (such as process 4).

As another preferred embodiment of the present invention, when the semi-persistent resources are used but the multi-subframe scheduling resources are reserved on the conflicting subframe D2 or U2, the HARQ process, which is used in the subframe D3 or U3 instructed by the follow-up multi-subframe scheduling, can be the HARQ process (such as process 3) corresponding to the subframe, and also can still use the HARQ process (such as process 2) corresponding to the backhaul subframe D2 or U2 on which the conflict occurs.

On the conflicting subframe, the RN uses the semi-persistent resources, or uses the multi-subframe scheduling resources or performs no processing. Whether the RN reserves the configuration for the semi-persistent resources; whether the RN reserves the configuration for the multi-subframe scheduling resources; whether the HARQ process used when using the semi-persistent resources is a process instructed by the multi-subframe scheduling; and when the multi-subframe scheduling resources are not used but the multi-subframe scheduling resources are reserved on the conflicting subframe, whether the used HARQ process on the subframe instructed by the follow-up multi-subframe scheduling is the HARQ process corresponding to the subframe, or is still using the HARQ process corresponding to the conflicting subframe; any combinations of the above features can be preferred embodiments of the present invention, which will not be described redundantly herein.

In addition to receiving the semi-persistent resources allocated by the base station, the above scenario resulting in the conflict can also be the following circumstance: the semi-persistent scheduling resources and the multi-subframe scheduling resources received by the RN instruct the RN to receive/send the data on the same subframe.

Here, the above semi-persistent resources refer to the resources to instruct the first transmission.

Embodiment 2

When a data transmission conflict occurs between the multi-subframe scheduling and the dynamic scheduling, the downlink assignment (or the uplink authorization) of the multi-subframe scheduling will be neglected on a backhaul subframe in which the conflict occurs while receiving the downlink data according to the downlink assignment of the dynamic scheduling (or sending the uplink data according to the uplink authorization of the dynamic scheduling). Since the dynamic scheduling only allocates the resources used in one subframe, it does not affect the follow-up subframes, which will not cause the conflict of the follow-up subframes, and therefore, the multi-subframe scheduling resource are reserved for the data transmission of the follow-up subframes.

Then, the follow-up multi-subframe scheduling continues after the backhaul subframe, namely the downlink data is received according to the downlink assignment of the multi-subframe scheduling (or the uplink data is sent according to the uplink authorization of the multi-subframe scheduling) on a subframe which is located after the current backhaul subframe and used in the multi-subframe scheduling.

Figure 9:
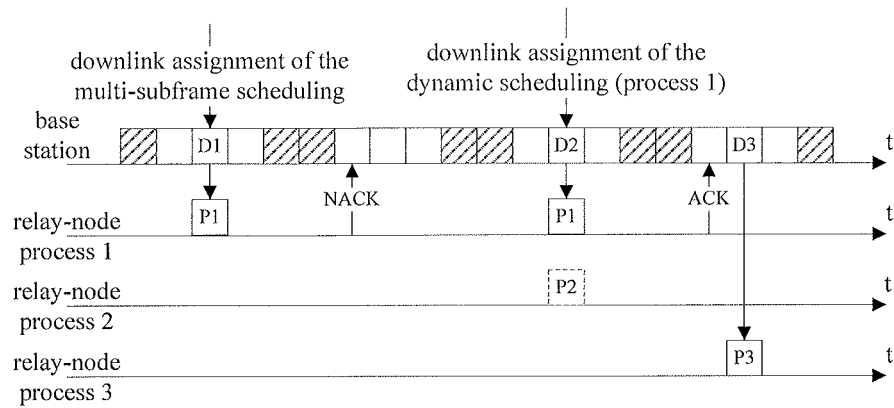
FIG. 9 is a particular flow chart of a method for processing a data transmission conflict of a relay-node according to embodiment 2 of the present invention.

In particular, in terms of the downlink transmission, it is shown in FIG. 9.

The RN receives and reserves downlink assignment of the multi-subframe scheduling sent by the base station on the subframe D1, and the downlink assignment instructs the RN to receive data on the subframes D1, D2 and D3 and process with process 1, process 2 and process 3 respectively; for example, the RN receives the data on the subframe D1 according to the downlink assignment of the multi-subframe scheduling and processes with process 1.

The RN has received downlink assignment of the dynamic scheduling sent by the base station on the subframe D2, the downlink assignment instructs the RN to receive the data on D2 and process with process 1. But the RN should receive the date on D2 and process with process 2 according to the reserved downlink assignment of the multi-subframe scheduling. That is to say, a data transmission conflict between the multi-subframe scheduling and the dynamic scheduling occurs on the subframe D2. At this time the RN processes according to the dynamic scheduling, namely it receives the data and processes with process 1 and neglects the data reception instructed by the multi-subframe scheduling. The instruction by the dynamic scheduling can be the first transmission, and also can be the retransmission. The RN reserves the configuration for the multi-subframe scheduling resources.

The RN receives the downlink data on D3 according to the reserved downlink assignment of the multi-subframe scheduling and processes with process 3. As a preferred embodiment of the present invention, because the RN does not use process 2 instructed by the multi-subframe scheduling on the subframe D2, the RN can also still use this process on D3, namely it receives the downlink data on D3 and processes with process 2.

Figure 10:
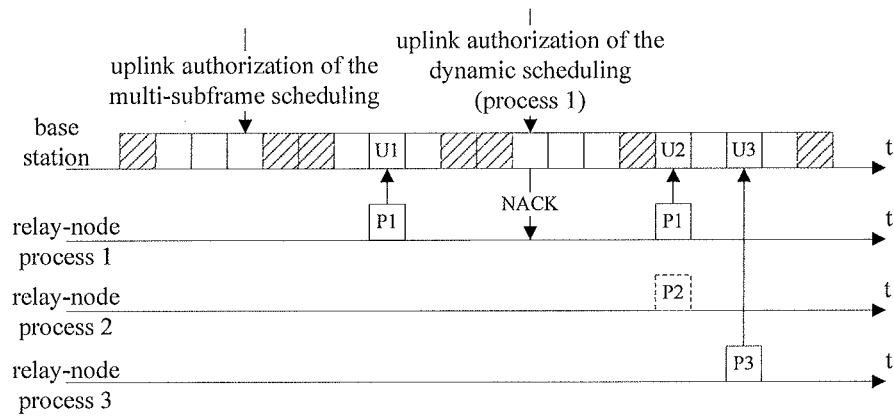
FIG. 10 is a particular flow chart of a method for processing a data transmission conflict of a relay-node according to embodiment 2 of the present invention.

In particular, in terms of the uplink transmission, it is shown in FIG. 10.

The RN has received uplink authorization of the multi-subframe scheduling sent by the base station on the subframe D; the uplink authorization instructs: the RN receives downlink data on the subframes U1, U2 and U3 and process with process 1, process 2 and process 3 respectively; and the RN reserves the uplink authorization of the multi-subframe scheduling.

The RN has received uplink authorization of the dynamic scheduling sent by the base station before the subframe U2; the uplink authorization instructs: the data is send on U2 and processed with process 1, but the RN should send the data on U2 and process with process 2 according to the reserved uplink authorization of the multi-subframe scheduling; that is to say, a data transmission conflict between the multi-subframe scheduling and the dynamic scheduling occurs on the subframe U2. At this time the RN processes according to the dynamic scheduling, namely it sends the data and processes with process 1 and neglects the data sending instructed by the multi-subframe scheduling. The instruction by the dynamic scheduling can be the first transmission, and also can be the retransmission. The RN reserves the configuration for the multi-subframe scheduling resources.

The RN sends the uplink data on U3 according to the resources of the reserved uplink authorization of the multi-subframe scheduling and processes with process 3. As a preferred embodiment of the present invention, because the RN does not use process 2 instructed by the multi-subframe scheduling on the subframe U2, the RN can also still use this process on the U3, namely it sends the uplink data on U3 and processes with process 2.

Figure 11:
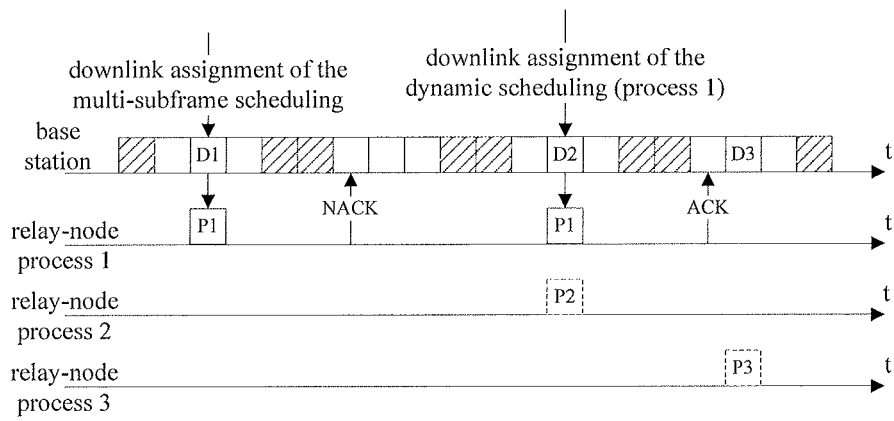
FIG. 11 is a particular flow chart of a method for processing a data transmission conflict of a relay-node according to embodiment 2 of the present invention.
Figure 12:
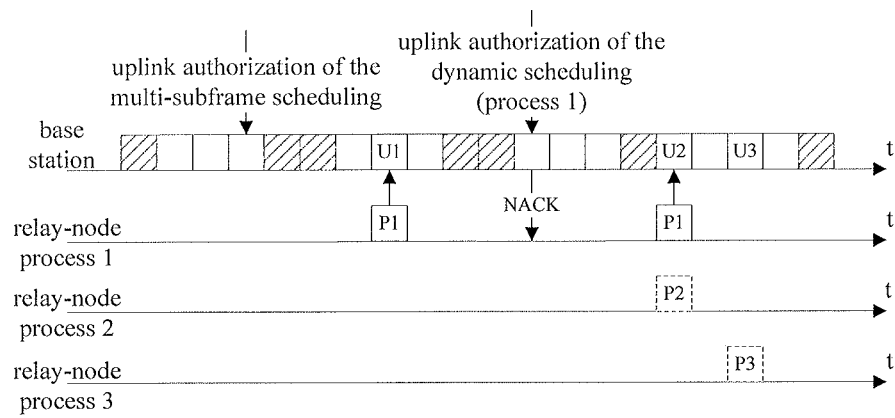
FIG. 12 is a particular flow chart of a method for processing a data transmission conflict of a relay-node according to embodiment 2 of the present invention.

As a preferred embodiment of the present invention, it can also be considered that the base station allocating the dynamic resources for the RN implies that the multi-subframe scheduling is required to be terminated, and therefore, as shown in FIG. 11 and FIG. 12, before or after the RN has received or sent the data on the conflicting subframe D2 or U2 by using the dynamic resources, it deletes the configuration for the multi-subframe scheduling resources, and it does not continue to process on the subframe D3 or U3 according to the multi-subframe scheduling.

As a preferred embodiment of the present invention, it can also be considered that the dynamic scheduling should not appear in the multi-subframe scheduling, namely the resources instructed by the dynamic scheduling are neglected on the conflicting subframe while receiving or sending the data according to the resources instructed by the multi-subframe scheduling. Accordingly, when the RN receives or sends the data on the conflicting subframe D2 or U2 by using the multi-subframe scheduling resources, it continues to process on the subframe D3 or U3 according to the multi-subframe scheduling. As a preferred embodiment of the present invention, the RN also can perform no processing on the conflicting subframe.

In addition to receiving the dynamic resources allocated by the base station, the above scenario resulting in the conflict can also be the following circumstance: in the uplink dynamic scheduling, the resources of the non-adaptive retransmission and the multi-subframe scheduling resources instruct the RN to receive the data on the same subframe.

Here, the above dynamic resources can be the resources to instruct the first transmission, can also be the resources to instruct the adaptive retransmission, and can also be the resources to instruct the non-adaptive retransmission.

Figure 13:
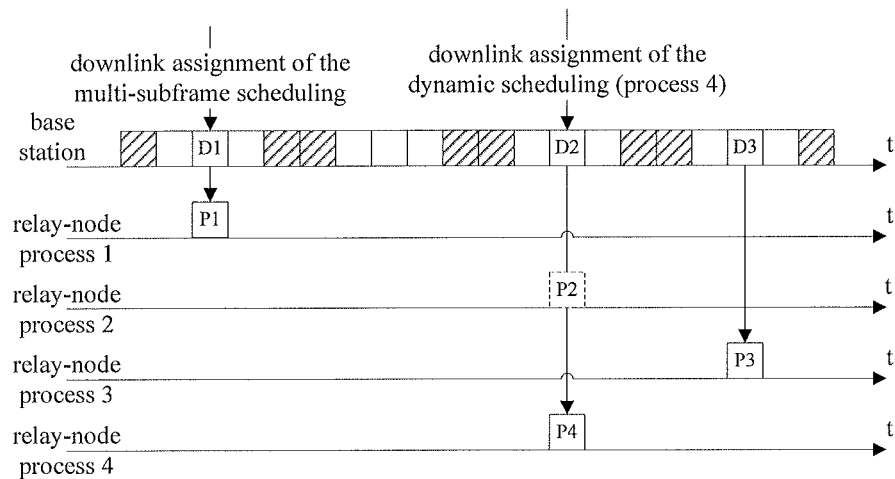
FIG. 13 is a particular flow chart of a method for processing a data transmission conflict of a relay-node according to embodiment 2 of the present invention.
Figure 14:
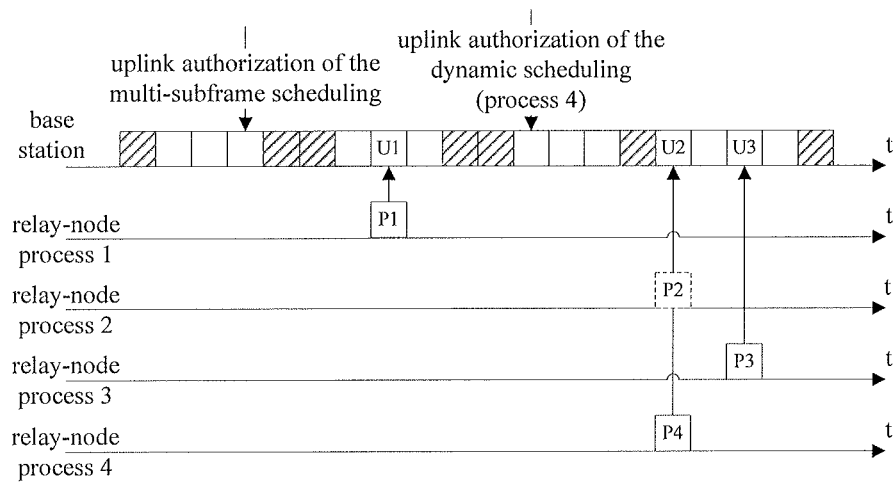
FIG. 14 is a particular flow chart of a method for processing a data transmission conflict of a relay-node according to embodiment 2 of the present invention.

In addition to the process instructed by the multi-subframe scheduling (such as process 1, process 2 and process 3), the process that the dynamic scheduling uses to instruct the data reception or sending can also be the processes other than the process instructed by the multi-subframe scheduling, such as process 4 (as shown in FIG. 13 and FIG. 14).

On the conflicting subframe, the RN uses the dynamic resources, or uses the multi-subframe scheduling resources or performs no processing. Whether the RN reserves the configuration for the multi-subframe scheduling resources; whether the HARQ process used when using the dynamic resources is a process instructed by the multi-subframe scheduling; and when the multi-subframe scheduling resources are not used but the multi-subframe scheduling resources are reserved on the conflicting subframe, whether the used HARQ process on the subframe instructed by the follow-up multi-subframe scheduling is the HARQ process corresponding to the subframe or is still using the HARQ process corresponding to the conflicting subframe; any of the combinations of above features can be used as the preferred embodiments of the present invention, which will not be described redundantly herein.

In the above process, the RRC signaling appointing the dedicated signaling of the UE or the RN can be implemented by adding fields of instruction information (such as configuration information of the downlink backhaul subframe, configuration information of the uplink backhaul subframe, HARQ time sequence which is dedicated to the RN, a corresponding relationship between a subframe and a process id, RNTI which is dedicated to the multi-subframe scheduling, and the number of the subframes etc.) in the existing RRC signaling (such as a message of RRC connection and reconfiguration), or introducing a new RRC signaling used for transferring the instruction information. In this case, the instruction information can be transmitted by the same RRC signaling or by a plurality of different RRC signalings.

According to the present invention, under the circumstance that a data transmission conflict occurs between the multi-subframe scheduling and the dynamic scheduling or a data transmission conflict occurs between the multi-subframe scheduling and the semi-persistent scheduling, the RN carries out the data transmission according to the multi-subframe scheduling and the dynamic scheduling or the semi-persistent scheduling by using the corresponding resources, thereby solving the problem of the data transmission conflict and achieving the normal transmission.

An apparatus for processing a data transmission conflict of a relay-node RN is provided according to the embodiments of the present invention, which is applied in the scenario that the above RN is configured with multi-subframe scheduling resources on a backhaul subframe.

Figure 15:
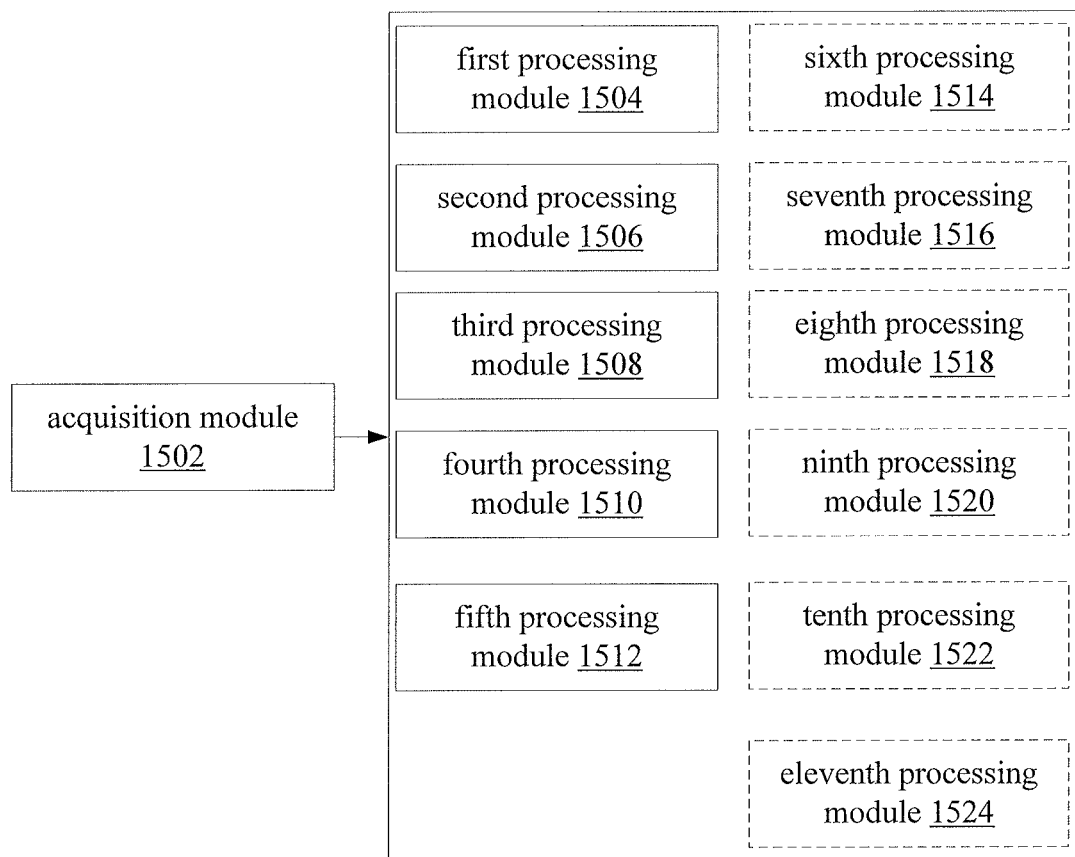
FIG. 15 is a structural diagram of an apparatus for processing a data transmission conflict of a relay-node according to an embodiment of the present invention.

As shown in FIG. 15, the apparatus comprises: an acquisition module 1502, adapted to acquire dynamic resources and semi-persistent resources on the above backhaul subframe; a first processing module 1504, adapted to, under the circumstance that the above dynamic resources has been acquired on the above backhaul subframe, receive or send data by using the above multi-subframe scheduling resources or the above dynamic resources on the above backhaul subframe, or perform no processing; and a second processing module 1506, adapted to, under the circumstance that the above semi-persistent resources has been acquired on the above backhaul subframe, receive or send data by using the above multi-subframe scheduling resources or the above semi-persistent resources on the above backhaul subframe, or perform no processing.

As another embodiment of the present invention, under the above circumstance of having acquired the dynamic resources, in addition to the above acquisition module 1502, the first processing module 1504 and the second processing module 1506, the above apparatus can further comprise: a third processing module 1508, adapted to, after having received or sent the data by using the above multi-subframe scheduling resources on the above backhaul subframe, delete the configuration for the above multi-subframe scheduling resources; a fourth processing module 1510, adapted to, before or after having received or sent the data by using the above multi-subframe scheduling resources on the above backhaul subframe, reserve the configuration for the above multi-subframe scheduling resources; and a fifth processing module 1512, adapted to, before or after having received or sent the data by using the above dynamic resources on the above backhaul subframe, delete or reserve the configuration for the above multi-subframe scheduling resources.

As still another embodiment of the present invention, under the above circumstance of having acquired the semi-persistent resources, in addition to the above acquisition module 1502, the first processing module 1504 and the second processing module 1506, the above apparatus can further comprise (as shown by the dotted line in FIG. 15): a sixth processing module 1514, adapted to, after having received or sent the data by using the above multi-subframe scheduling resources on the above backhaul subframe, delete the configuration for the above multi-subframe scheduling resources; a seventh processing module 1516, adapted to, before or after having received or sent the data by using the above multi-subframe scheduling resources on the above backhaul subframe, reserve the configuration for the above multi-subframe scheduling resources; and an eighth processing module 1518, adapted to, before or after having received or sent the data by using the above semi-persistent resources on the above backhaul subframe, delete or reserve the configuration for the above multi-subframe scheduling resources.

Further, under the above circumstance of having acquired the semi-persistent resources, the above apparatus can further comprise: a ninth processing module 1520, adapted to, before or after having received or sent the data by using the above multi-subframe scheduling resources on the above backhaul subframe, delete or reserve the configuration for the above semi-persistent resources; a tenth processing module 1522, adapted to, after having received or sent the data by using the above semi-persistent resources on the above backhaul subframe, delete the configuration for the above semi-persistent resources; and an eleventh processing module 1524, adapted to, before or after having received or sent the data by using the above semi-persistent resources on the above backhaul subframe, reserve the configuration for the above semi-persistent resources.

According to the present invention, under the circumstance that a data transmission conflict occurs between the multi-subframe scheduling and the dynamic scheduling or a data transmission conflict occurs between the multi-subframe scheduling and the semi-persistent scheduling, the RN carries out the data transmission according to the multi-subframe scheduling, the dynamic scheduling or the semi-persistent scheduling by using the corresponding resources, thereby solving the problem of the data transmission conflict and achieving the normal transmission.

It needs to be noted that steps shown in the flow chart of the drawings can be executed in, for example, a computer system with a group of computer executable instructions. Moreover, although the logical order is shown in the flow chart, in some cases, the steps shown or described can be carried out in a different order.

Obviously, those skilled in the art should understand that the above modules and steps of the present invention can be realized by using general purpose calculating device, which can be integrated in one calculating device or distributed on a network which consists of a plurality of calculating devices; alternatively, they can be realized by using the executable program code of the calculating device, consequently, they can be stored in the storing device and executed by the calculating device; or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method comprising:
   in response to an occurrence of a data transmission conflict referring to a relay-node (RN) being configured with multi-subframe scheduling resources on a backhaul subframe, and having acquired dynamic or semi-persistent resources on the backhaul subframe:
   if the RN having acquired the dynamic resources on the backhaul subframe, the RN receiving or sending data by using the multi-subframe scheduling resources or the dynamic resources on the backhaul subframe; and
   if the RN having acquired the semi-persistent resources on the backhaul subframe, the RN receiving or sending data by using the multi-subframe scheduling resources or the semi-persistent resources on the backhaul subframe, wherein the multi-subframe scheduling resources refer to resources which are allocated by a base station to the RN to instruct the RN to receive the data on sequential multiple downlink backhaul subframes or send the data on the sequential multiple uplink backhaul subframes.

2. The method according to claim 1, wherein the step of the RN having acquired dynamic resources comprises:

on the backhaul subframe or before the backhaul subframe, the RN detecting and obtaining the dynamic resources by a temporary cell radio network identifier (C-RNTI) or a dedicated C-RNTI of the RN on a physical downlink control channel (R-PDCCH) which is dedicated to RNs.

3. The method according to claim 1, wherein under the circumstance that the RN sends the data, the step of the RN having acquired dynamic resources comprises:

on the backhaul subframe, the RN being configured with the dynamic resources used for non-adaptive retransmission, to instruct the RN to send the data on the backhaul subframe.

4. The method according to claim 1, wherein the step of the RN having acquired semi-persistent resources comprises:

on the backhaul subframe or before the backhaul subframe, the RN detecting and obtaining the semi-persistent resources by a temporary semi-persistent scheduling cell radio network identifier (SPS C-RNTI) or a dedicated SPS C-RNTI of the RN on a physical downlink control channel (R-PDCCH) which is dedicated to RNs; or on the backhaul subframe, the RN being configured with the semi-persistent resources.

5. The method according to claim 1, wherein under the circumstance that the RN has acquired the dynamic resources, the method further comprises:

on the backhaul subframe, after the RN having received or sent the data by using the multi-subframe scheduling resources, the RN deleting the configuration for the multi-subframe scheduling resources; or on the backhaul subframe, before or after the RN having received or sent the data by using the multi-subframe scheduling resources, the RN reserving the configuration for the multi-subframe scheduling resources; or on the backhaul subframe, before or after the RN having received or sent the data by using the dynamic resources, the RN deleting or reserving the configuration for the multi-subframe scheduling resources.

6. The method according to claim 5, wherein under the circumstance that the RN uses the dynamic resources and the RN reserves the multi-subframe scheduling resources, the method further comprises:

on the next backhaul subframe which is located after the backhaul subframe and instructed by a multi-subframe scheduling, the RN using a hybrid automatic repeat request (HARQ) process corresponding to the next backhaul subframe, or using an HARQ process corresponding to the backhaul subframe.

7. The method according to claim 1, wherein under the circumstance that the RN has acquired the semi-persistent resources, the method further comprises:

on the backhaul subframe, after the RN having received or sent the data by using the multi-subframe scheduling resources, the RN deleting the configuration for the multi-subframe scheduling resources; or on the backhaul subframe, before or after the RN having received or sent the data by using the multi-subframe scheduling resources, the RN reserving the configuration for the multi-subframe scheduling resources; or on the backhaul subframe, before or after the RN having received or sent the data by using the semi-persistent resources, the RN deleting or reserving the configuration for the multi-subframe scheduling resources.

8. The method according to claim 7, wherein the method further comprises:

on the backhaul subframe, before or after the RN having received or sent the data by using the multi-subframe scheduling resources, the RN deleting or reserving the configuration for the semi-persistent resources; or on the backhaul subframe, after the RN having received or sent the data by using the semi-persistent resources, the RN deleting the configuration for the semi-persistent resources; or on the backhaul subframe, before or after the RN having received or sent the data by using the semi-persistent resources, the RN reserving the configuration for the semi-persistent resources.

9. The method according to claim 7, wherein under the circumstance that the RN uses the semi-persistent resources and the RN reserves the multi-subframe scheduling resources, the method further comprises:

on the next backhaul subframe which is located after the backhaul subframe and instructed by a multi-subframe scheduling, the RN using an HARQ process corresponding to the next backhaul subframe, or using an HARQ process corresponding to the backhaul subframe.

10. The method according to claim 1, wherein the step of the RN receiving or sending data by using the dynamic resources or the semi-persistent resources comprises:

the RN receiving or sending the data by using the dynamic resources or the semi-persistent resources with a hybrid automatic repeat request (HARQ) process, wherein the HARQ process comprises: one of HARQ processes which is instructed by the multi-subframe scheduling, or an HARQ process which is not instructed by the multi-subframe.

11. The method according to claim 2, wherein under the circumstance that the RN has acquired the dynamic resources, the method further comprises:

on the backhaul subframe, after the RN having received or sent the data by using the multi-subframe scheduling resources, the RN deleting the configuration for the multi-subframe scheduling resources; or on the backhaul subframe, before or after the RN having received or sent the data by using the multi-subframe scheduling resources, the RN reserving the configuration for the multi-subframe scheduling resources; or on the backhaul subframe, before or after the RN having received or sent the data by using the dynamic resources, the RN deleting or reserving the configuration for the multi-subframe scheduling resources.

12. The method according to claim 11, wherein under the circumstance that the RN uses the dynamic resources and the RN reserves the multi-subframe scheduling resources, the method further comprises:

on the next backhaul subframe which is located after the backhaul subframe and instructed by a multi-subframe scheduling, the RN using a hybrid automatic repeat request (HARQ) process corresponding to the next backhaul subframe, or using an HARQ process corresponding to the backhaul subframe.

13. The method according to claim 3, wherein under the circumstance that the RN has acquired the dynamic resources, the method further comprises:

on the backhaul subframe, after the RN having received or sent the data by using the multi-subframe scheduling resources, the RN deleting the configuration for the multi-subframe scheduling resources; or on the backhaul subframe, before or after the RN having received or sent the data by using the multi-subframe scheduling resources, the RN reserving the configuration for the multi-subframe scheduling resources; or on the backhaul subframe, before or after the RN having received or sent the data by using the dynamic resources, the RN deleting or reserving the configuration for the multi-subframe scheduling resources.

14. The method according to claim 13, wherein under the circumstance that the RN uses the dynamic resources and the RN reserves the multi-subframe scheduling resources, the method further comprises:

on the next backhaul subframe which is located after the backhaul subframe and instructed by a multi-subframe scheduling, the RN using a hybrid automatic repeat request (HARQ) process corresponding to the next backhaul subframe, or using an HARQ process corresponding to the backhaul subframe.

15. The method according to claim 4, wherein under the circumstance that the RN has acquired the semi-persistent resources, the method further comprises:

on the backhaul subframe, after the RN having received or sent the data by using the multi-subframe scheduling resources, the RN deleting the configuration for the multi-subframe scheduling resources; or on the backhaul subframe, before or after the RN having received or sent the data by using the multi-subframe scheduling resources, the RN reserving the configuration for the multi-subframe scheduling resources; or on the backhaul subframe, before or after the RN having received or sent the data by using the semi-persistent resources, the RN deleting or reserving the configuration for the multi-subframe scheduling resources.

16. The method according to claim 15, wherein the method further comprises:

on the backhaul subframe, before or after the RN having received or sent the data by using the multi-subframe scheduling resources, the RN deleting or reserving the configuration for the semi-persistent resources; or on the backhaul subframe, after the RN having received or sent the data by using the semi-persistent resources, the RN deleting the configuration for the semi-persistent resources; or on the backhaul subframe, before or after the RN having received or sent the data by using the semi-persistent resources, the RN reserving the configuration for the semi-persistent resources.

17. The method according to claim 15, wherein under the circumstance that the RN uses the semi-persistent resources and the RN reserves the multi-subframe scheduling resources, the method further comprises:

on the next backhaul subframe which is located after the backhaul subframe and instructed by a multi-subframe scheduling, the RN using an HARQ process corresponding to the next backhaul subframe, or using an HARQ process corresponding to the backhaul subframe.

18. An apparatus comprising:

an acquisition module, used to acquire dynamic resources or semi-persistent resources on a backhaul subframe;

a first processing module, used to, under a data transmission conflict that the RN is configured with multi-subframe scheduling resources on a backhaul subframe and dynamic resources have been acquired on the backhaul subframe, receive or send data by using the multi-subframe scheduling resources or the dynamic resources on the backhaul subframe; and a second processing module, used to, under a data transmission conflict that the RN is configured with multi-subframe scheduling resources on the backhaul subframe and semi-persistent resources have been acquired on the backhaul subframe, receive or send data by using the multi-subframe scheduling resources or the semi-persistent resources on the backhaul subframe;

wherein the multi-subframe scheduling resources refer to resources which are allocated by a base station to the RN to instruct the RN to receive the data on sequential multiple downlink backhaul subframes or send the data on the sequential multiple uplink backhaul subframes.

19. The apparatus according to claim 18, wherein under the circumstance of acquiring the dynamic resources, the apparatus further comprises:

a third processing module, used to, after having received or sent the data by using the multi-subframe scheduling resources on the backhaul subframe, delete the configuration for the multi-subframe scheduling resources;

a fourth processing module, used to, before or after having received or sent the data by using the multi-subframe scheduling resources on the backhaul subframe, reserve the configuration for the multi-subframe scheduling resources; and a fifth processing module, used to, before or after having received or sent the data by using the dynamic resources on the backhaul subframe, delete or reserve the configuration for the multi-subframe scheduling resources.

20. The apparatus according to claim 18, wherein under the circumstance of acquiring the semi-persistent resources, the apparatus further comprises:

a sixth processing module, used to, after having received or sent the data by using the multi-subframe scheduling resources on the backhaul subframe, delete the configuration for the multi-subframe scheduling resources;

a seventh processing module, used to, before or after having received or sent the data by using the multi-subframe scheduling resources on the backhaul subframe, reserve the configuration for the multi-subframe scheduling resources; and an eighth processing module, used to, before or after having received or sent the data by using the semi-persistent resources on the backhaul subframe, delete or reserve the configuration for the multi-subframe scheduling resources.

21. The apparatus according to claim 20, wherein under the circumstance of acquiring the semi-persistent resources, the apparatus further comprises:

a ninth processing module, used to, before or after having received or sent the data by using the multi-subframe scheduling resources on the backhaul subframe, delete or reserve the configuration for the semi-persistent resources;

a tenth processing module, used to, after having received or sent the data by using the semi-persistent resources on the backhaul subframe, delete the configuration for the semi-persistent resources; and an eleventh processing module, used to, before or after having received or sent the data by using the semi-persistent resources on the backhaul subframe, reserve the configuration for the semi-persistent resources.

22. A relay-node (RN) comprising:

an acquisition module, used to acquire dynamic resources or semi-persistent resources on the backhaul subframe;

a first processing module, used to, under a data transmission conflict that the RN is configured with multi-subframe scheduling resources on a backhaul subframe and that the dynamic resources have been acquired on the backhaul subframe, receive or send data by using the multi-subframe scheduling resources or the dynamic resources on the backhaul subframe; and a second processing module, used to, under a data transmission conflict that the RN is configured with multi-subframe scheduling resources on a backhaul subframe and that the semi-persistent resources have been acquired on the backhaul subframe, receive or send data by using the multi-subframe scheduling resources or the semi-persistent resources on the backhaul subframe;

wherein the multi-subframe scheduling resources refer to resources which are allocated by a base station to the RN to instruct the RN to receive the data on sequential multiple downlink backhaul subframes or send the data on the sequential multiple uplink backhaul subframes.

* * * * *